United States Patent
Glasco et al.

(10) Patent No.: US 8,099,650 B1
(45) Date of Patent: Jan. 17, 2012

(54) L2 ECC IMPLEMENTATION

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
Karan Mehra, Cary, NC (US); James Roberts, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 810 days.

(21) Appl. No.: 12/202,160

(22) Filed: Aug. 29, 2008

(51) Int. Cl.
*G06F 11/10* (2006.01)

(52) U.S. Cl. .................................................. 714/763

(58) Field of Classification Search .......... 714/751–755, 714/757–764, 766–769, 773, 798–801
See application file for complete search history.

(56) References Cited

U.S. PATENT DOCUMENTS

| | | | | |
|---|---|---|---|---|
| 6,038,693 A * | 3/2000 | Zhang | ........................... | 714/768 |
| 6,212,631 B1 * | 4/2001 | Springer et al. | .................. | 713/1 |
| 2003/0009721 A1 * | 1/2003 | Hsu et al. | ...................... | 714/773 |
| 2009/0063923 A1 * | 3/2009 | Gower et al. | ................. | 714/746 |
| 2010/0269021 A1 * | 10/2010 | Gower et al. | ................. | 714/764 |

* cited by examiner

*Primary Examiner* — Nadeem Iqbal

(74) *Attorney, Agent, or Firm* — Patterson & Sheridan, LLP.

(57) ABSTRACT

One embodiment of the present invention sets forth a method for implementing ECC protection in an on-chip L2 cache. When data is written to or read from an external memory, logic within the L2 cache is configured to generate ECC check bits and store the ECC check bits in the L2 cache in space typically allocated for storing byte enables. As a result, data stored in the L2 cache may be protected against bit errors without incurring the costs of providing additional storage or complex hardware for the ECC check bits.

20 Claims, 7 Drawing Sheets

L2 ECC IMPLEMENTATION

BACKGROUND OF THE INVENTION

1. Field of the Invention

Embodiments of the present invention relate generally to data processing and, more specifically, to implementing ECC protection in an on-chip L2 cache.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., off-chip frame buffer memory or dynamic random access memory (DRAM) units) and internal clients of the memory subsystem (referred to herein as the "clients"). The L2 cache temporarily stores data that the clients are reading from and writing to the external memory.

Typically, when writing data to the external memory, the clients are not required to write the whole data word. Instead, the clients provide "byte enables" that indicate which bytes of the word are written and which bytes are not written. The L2 cache stores the byte enables along with the data. For example, when a client writes 32 bits (i.e., 4 bytes) of data to the external memory, the L2 cache stores the 32 bits of data and 4 bits of byte enables (one 1-bit byte enable per byte of data), resulting in a total storage requirement of 36 bits. The byte enables indicate that the byte stored in the L2 cache is "updated," and the byte represents the most recently written value of the corresponding location in the external memory. A byte that is enabled indicates that the value must be written to the external memory so that the external memory gets the most recently written value. A byte that is not enabled does not need to be written to the external memory.

One problem with the L2 cache is that this type of memory is subject to bit errors that may corrupt the data stored in the cache, especially as the memory size increases. One approach to mitigating bit errors and reducing the incidence of corrupted and unusable data is to use an Error Correcting Code (ECC) for the cached data. For example, when data is written to the L2 cache, an ECC may be used to generate check bits that correspond to the data being stored in the L2 cache. The ECC check bits may then be stored and retrieved at a later time whenever the stored data is accessed. The check bits when combined with the stored data are used to detect if the data stored in the L2 cache is corrupted, and in some cases of data corruption, to allow the data to be corrected. A significant drawback to implementing an ECC for the L2 cache is that storing the ECC check bits requires additional die space and potentially additional hardware, making the implementation far less attractive.

As the foregoing illustrates, what is needed in the art is a technique for protecting data stored in the L2 cache against data corruption without incurring the costs of conventional ECC implementations.

SUMMARY OF THE INVENTION

One embodiment of the present invention sets forth a method for implementing error code correction (ECC) protection with respect to a write operation to an external memory via an intermediary cache. The method comprises the steps of receiving a write command that includes a word of data comprised of a plurality of bytes and determining whether all bytes in the plurality of bytes are enabled or coherent. The method further comprises the steps of generating one or more ECC check bits for the plurality of bytes once all bytes in the plurality of bytes are enabled or coherent and storing the one or more ECC check bits in the intermediary cache instead of storing a byte enable for each byte in the plurality of bytes.

One advantage of the disclosed method is that data stored in the L2 cache may be protected against bit errors without incurring the costs of providing additional storage or complex hardware for the ECC check bits.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
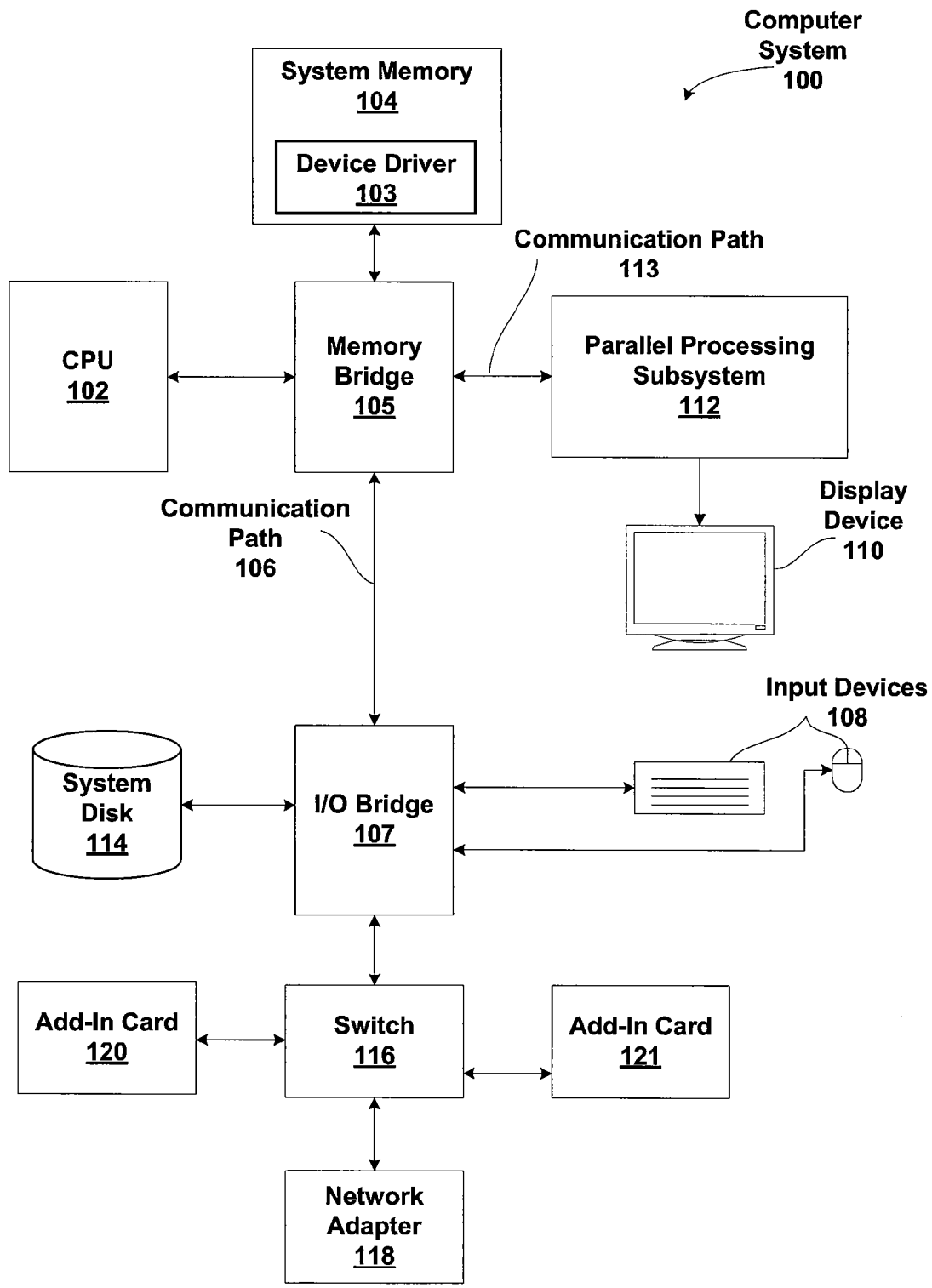
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
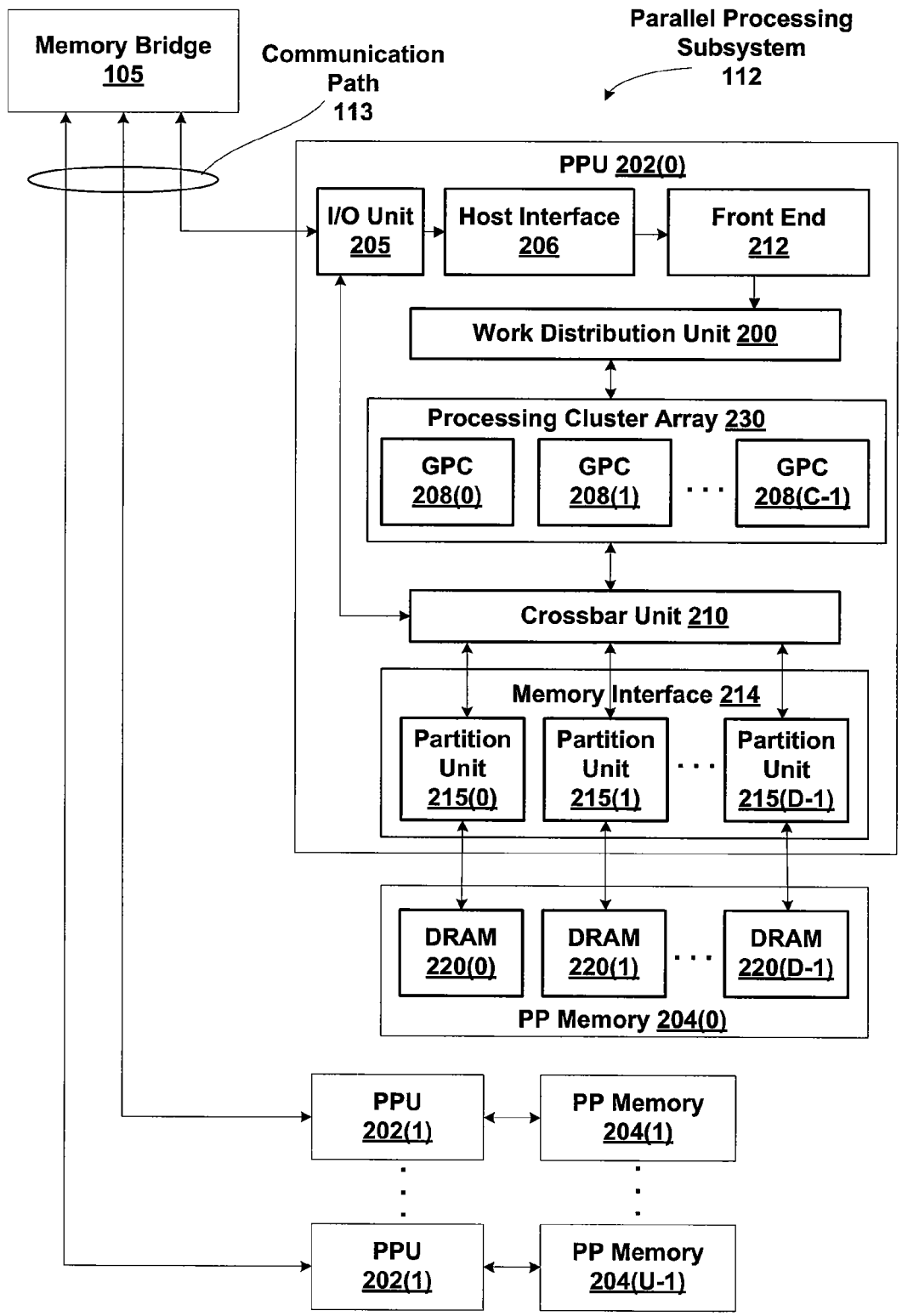
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
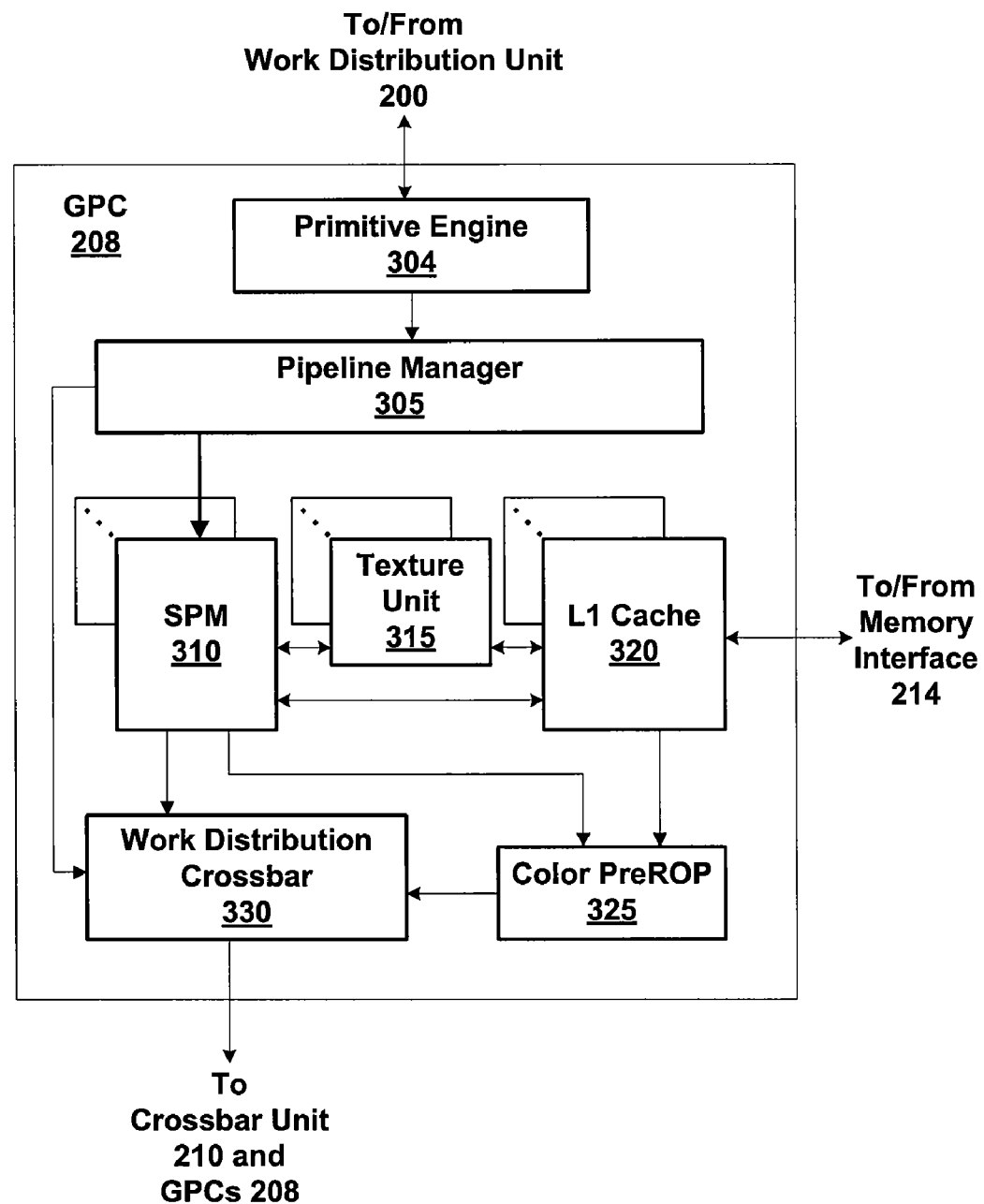
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
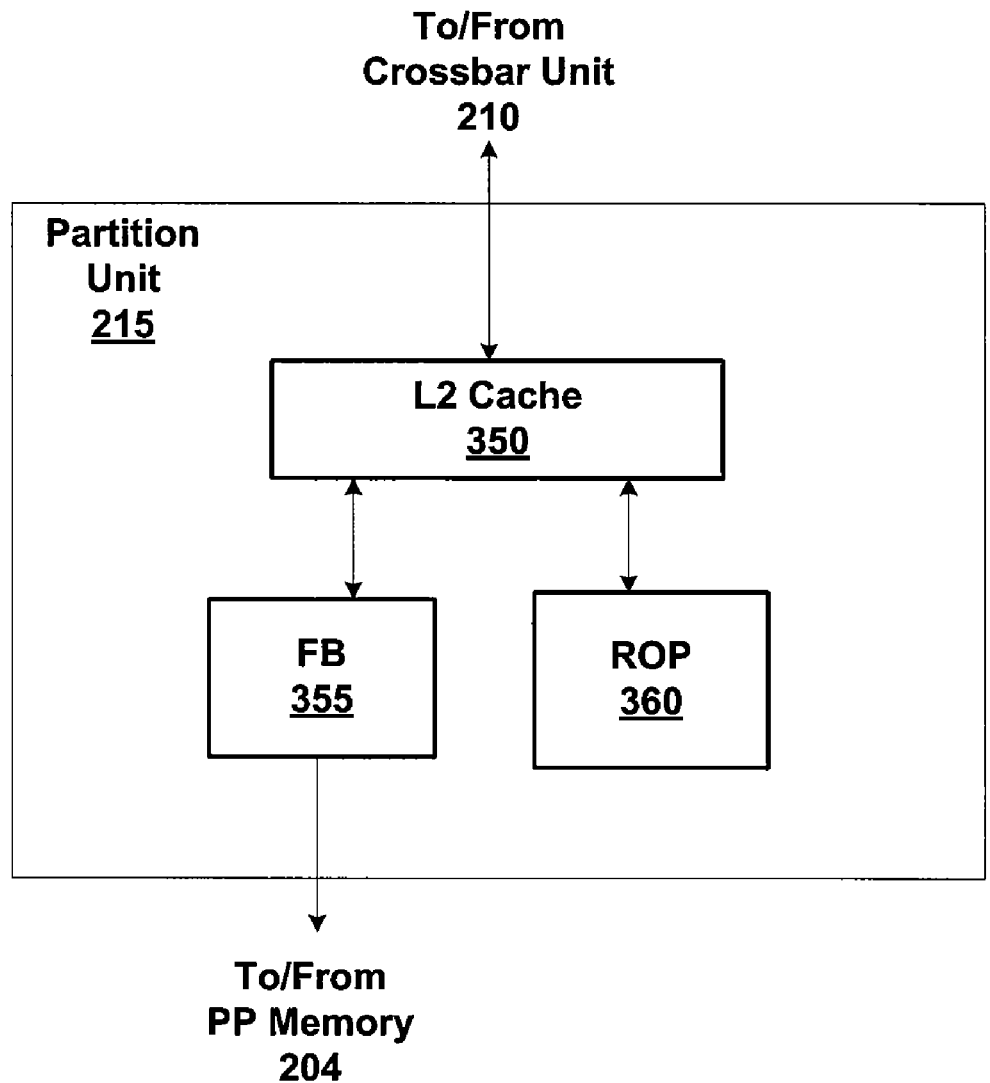
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

L2 ECC Implementation

Figure 4:
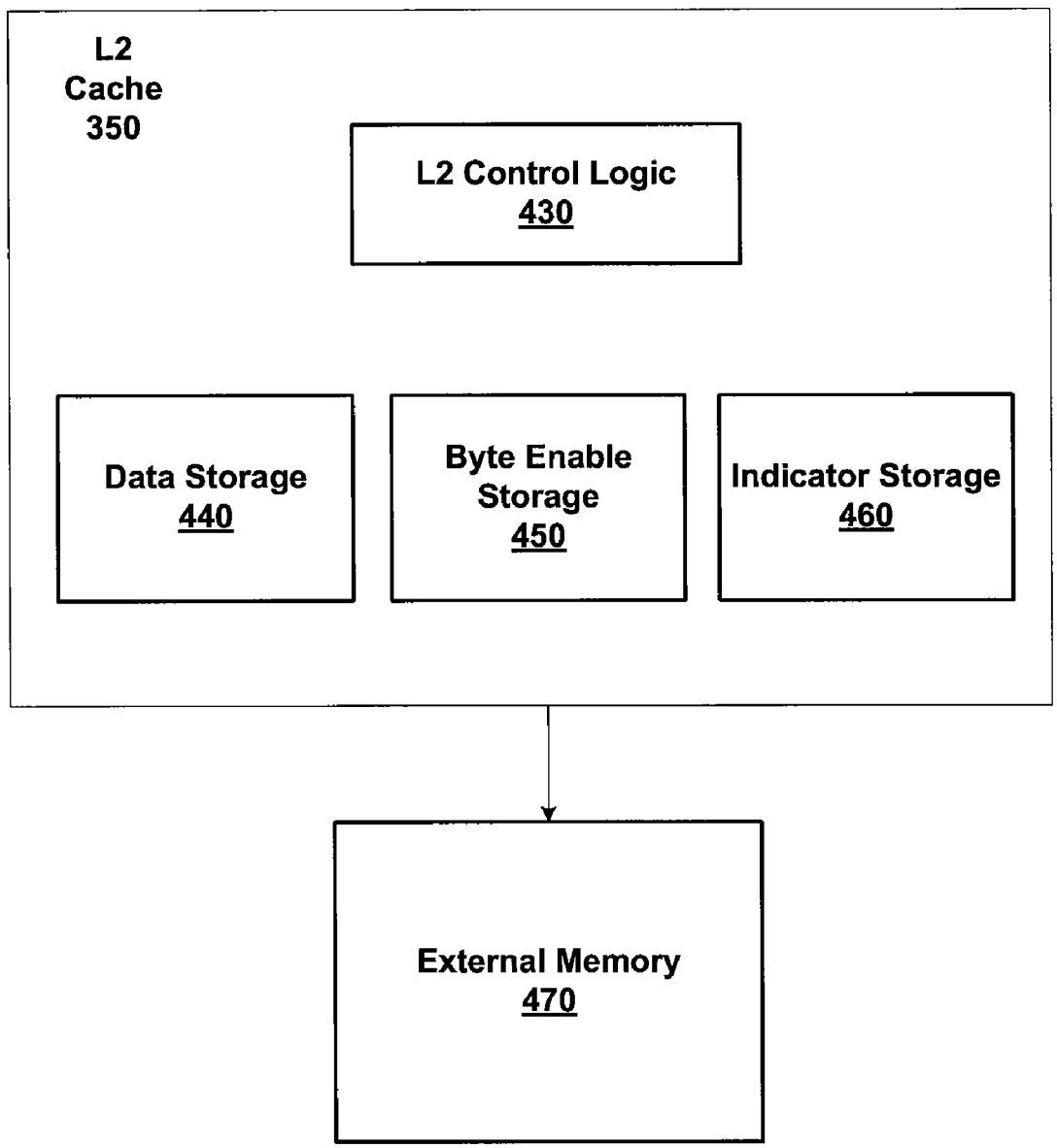
FIG. 4 is a block diagram of an L2 cache within one of the partition units of FIG. 2, according to one embodiment of the present invention.

FIG. 4 is a block diagram of an L2 cache 350 within one of the partition units 215 of FIG. 2, according to one embodiment of the present invention. As shown, the L2 cache 350 includes L2 control logic 430, data storage 440, byte enable storage 450, and indicator storage 460. The L2 cache 350 is configured to interface with external memory 470 (e.g., off-chip FB 355, parallel processing memory 204, and/or system memory 104).

When data is written to or read from the external memory 470 by a client entity within a parallel processing subsystem 112 (e.g., one of the GPCs 208), that data is temporarily stored in the L2 cache 350, as previously described herein. The control logic 430 is configured to follow the method steps described in FIGS. 5 and 6 to generate ECC check bits related to that data. The L2 control logic 430 is further configured to store the ECC check bits in the byte enable storage 450, which is a storage space typically allocated for storing byte enables. In this fashion, embodiments of the present invention enable ECC functionality relative to the data stored in the L2 cache 350 without necessarily increasing the die space allocated to the L2 cache 350.

Figure 5:
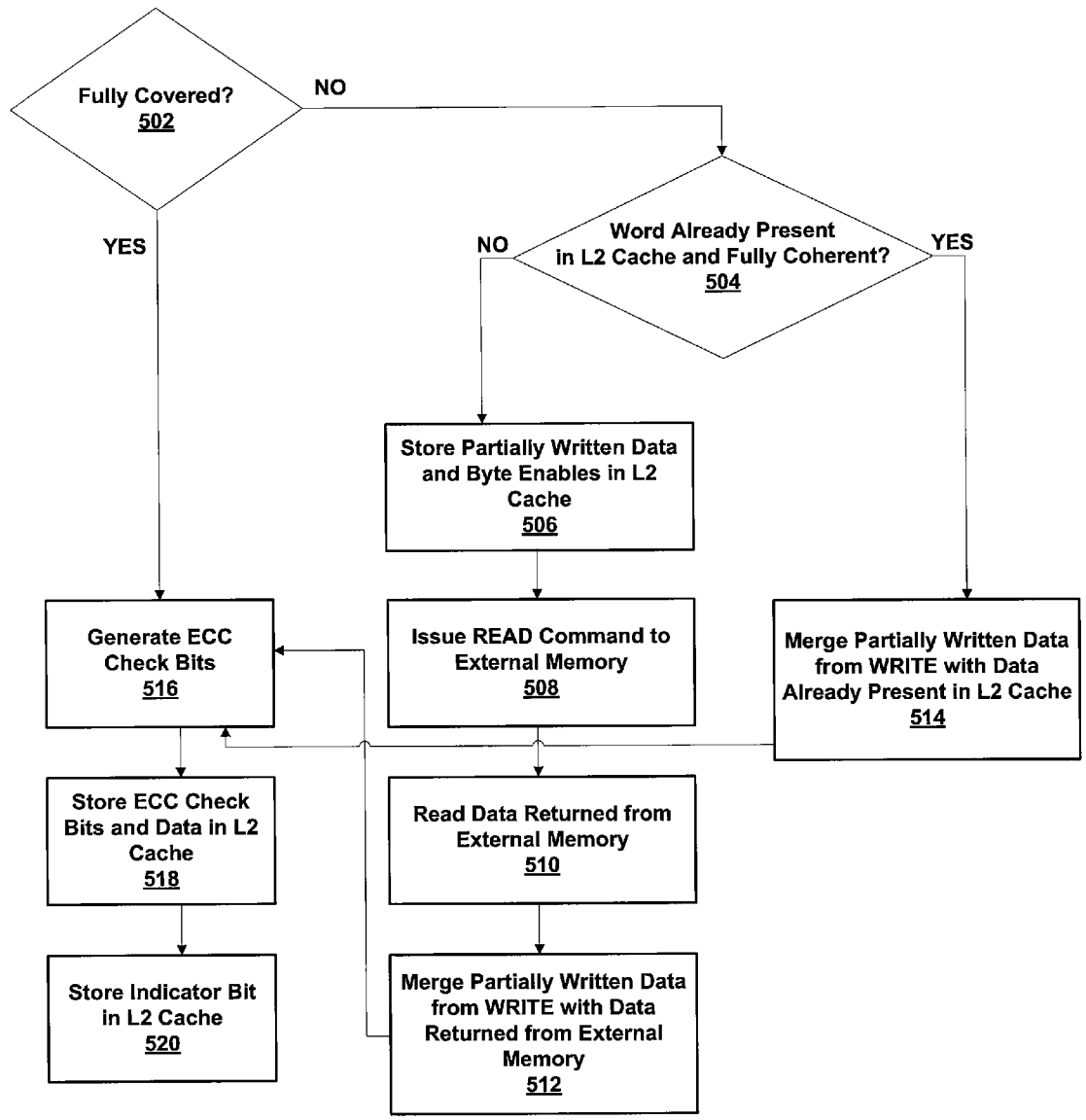
FIG. 5 is a flow diagram of method steps for storing data and associated ECC check bits following a WRITE operation, according to one embodiment of the present invention.

FIG. 5 is a flow diagram of method steps for storing data and associated ECC check bits following a WRITE operation, according to one embodiment of the present invention. While the method steps are described in conjunction with FIGS. 1-4, persons skilled in the art will recognize that any system configured to perform the method steps, in any order, is within the scope of the present invention.

The method begins in step 502, where the L2 control logic 430 determines whether a word of data received by the L2 cache 350 in the WRITE operation is "fully covered." As used herein, the term "fully covered" refers to a situation when the word of data received actually includes all of the bytes of data associated with the word. In such instances, all bytes of data associated with the word are indicated to be enabled and the WRITE operation is referred to as a "fully covered WRITE." Similarly, a word of data received in the L2 cache 350 is "not fully covered" when only some of the bytes of data associated with the word are indicated to be enabled, and others are not indicated to be enabled. In such instances, the WRITE operation is referred to as a "partially covered WRITE."

If, in step 502, the L2 control logic 430 determines that the word received in the WRITE operation is fully covered, then the method proceeds to step 516, where the L2 control logic 430 generates ECC check bits for the word. In step 518, the L2 control logic 430 stores the ECC check bits in the byte enable storage 450 and stores the byte of data associated with the word in the data storage 440. Since ECC check bits are generated for a word only when all of the bytes of data associated with the word are present in the L2 cache 350, the presence of the ECC check bits indicates that all bytes of data associated with the word are enabled, advantageously alleviating the need to store a separate byte enable for each individual byte of data.

The method ends in step 520, where the L2 control logic 430 sets an indicator bit to indicate that the byte enable storage 450 includes the ECC check bits rather than the individual byte enables for the word of data. The L2 control logic 430 may store the indicator bit in the indicator storage 460.

In the embodiment described above, the ECC check bits are generated at once for the whole word. In other embodiments, ECC check bits and data may be partitioned. For example, each word of data may be partitioned into 4 pieces. In such embodiments, ECC check bits may be generated for each piece separately (i.e., generated "per piece"), but stored as one group of ECC check bits (i.e., stored "per word"). Alternatively, ECC check bits may be generated for each piece separately and stored "per piece" instead of being stored "per word," as long as an indicator bit for each piece is set.

If, however, in step 502, the L2 control logic 430 determines that the word received in the WRITE operation is not fully covered, then the method proceeds to step 504. In step 504, the L2 control logic 430 determines whether the word received in the WRITE operation is already present in the L2 cache 350 and is fully coherent. As used herein, the term "coherency" refers to a situation when a byte of data stored in the L2 cache 350 is the same byte of data stored in a corresponding location in the external memory 470.

If, in step 504, the L2 control logic 430 determines that the word received in the WRITE operation is already present in the L2 cache 350 and is fully coherent, then the method proceeds to step 514, where the L2 control logic 430 merges the bytes of data received in the WRITE operation with the bytes of data already present in the L2 cache 350. Consequently, after step 514, all of the bytes of data associated with the word are present in the L2 cache 350 (i.e., the word is fully covered and coherent). The method then proceeds to step 516, where the L2 control logic 430 generates ECC check bits for the word of data, as previously described herein.

If, however, in step 504, the L2 control logic 430 determines that the word received in the WRITE operation is not already present in the L2 cache 350 and is not fully coherent, then the method proceeds to step 506, where the L2 control logic 430 stores the bytes of data received in the WRITE operation in the data storage 440 and stores byte enables associated with those bytes of data in the byte enable storage 450. In step 508, the L2 control logic 430 issues a READ command to the external memory 470 to obtain the missing bytes of data associated with the word to ensure that the word of data now being stored in the L2 cache 350 is coherent. In step 510, the L2 control logic 430 reads the data returned from the external memory 470 and, in step 512, merges the bytes of data received in the WRITE operation with the bytes of data returned from the external memory 470 in response to the READ command. Consequently, after step 512, all of the bytes of data associated with the word are present in the L2 cache 350 (i.e., the word is fully covered and coherent). The method then proceeds to step 516, where the L2 control logic 430 generates ECC check bits for the word of data, as previously described herein.

Figure 6:
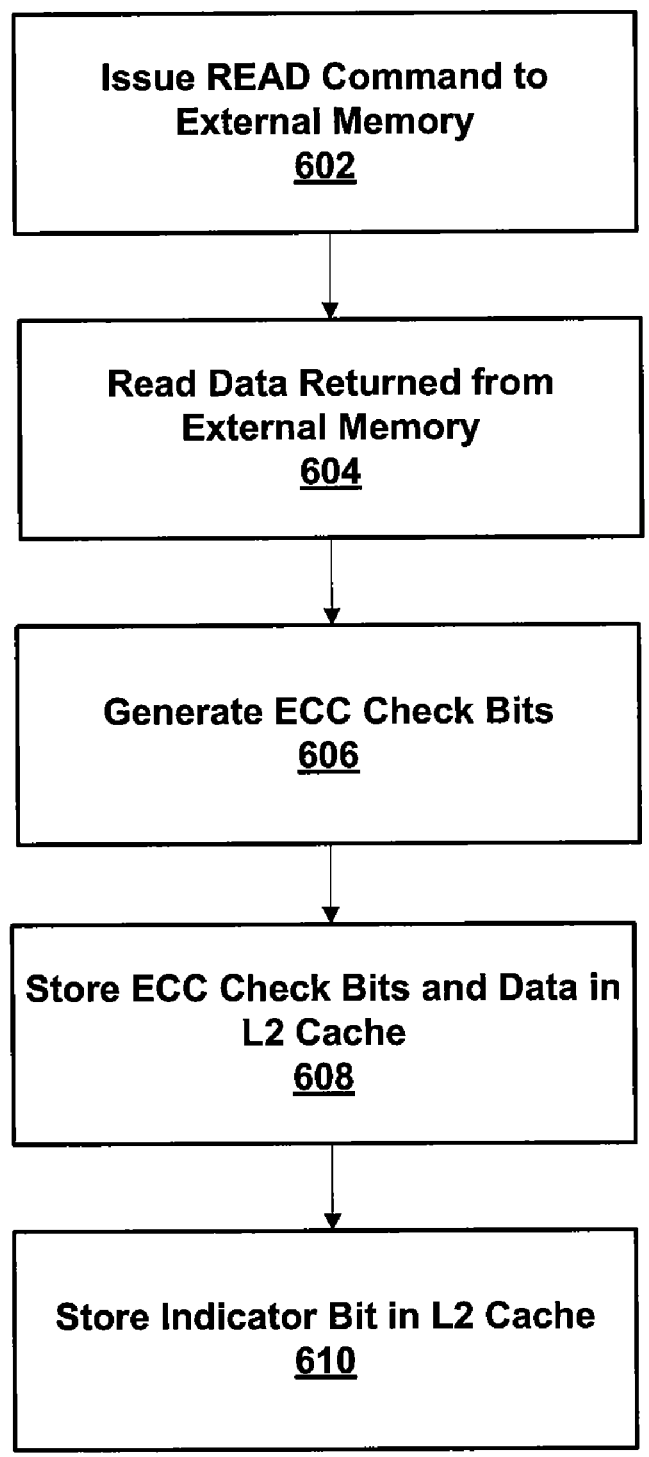
FIG. 6 is a flow diagram of method steps for storing data and associated ECC check bits following a READ operation, according to one embodiment of the present invention.

FIG. 6 is a flow diagram of method steps for storing data and associated ECC check bits following a READ operation, according to one embodiment of the present invention. Again, while the method steps are described in conjunction with FIGS. 1-4, persons skilled in the art will recognize that any system configured to perform the method steps, in any order, is within the scope of the present invention.

The method begins in step 602, where the L2 control logic 430 issues a READ command to the external memory 470 to obtain all bytes of data associated with a word of data. In step 604, the L2 control logic 430 reads the data returned from the external memory 470. Since the data returned from the external memory 470 is typically fully covered and coherent, in step 606, the L2 control logic 430 is able to generate ECC check bits for the word of data. In step 608, the L2 control logic 430 stores the ECC check bits in the byte enable storage 450 and stores the bytes of data associated with the word in the data storage 440. The method ends in step 610, where the L2 control logic 430 sets the indicator bit to indicate that the byte enable storage 450 includes the ECC check bits rather than the individual byte enables for the word of data and stores the indicator bit in the indicator storage 460.

As the above description illustrates, ECC protection for a word of data stored in the L2 cache 350 may be provided, in a partially covered WRITE scenario, by issuing a READ command to obtain the missing bytes of data associated with the word from the external memory 470 prior to generating the ECC check bits for the word. In a fully covered WRITE or a READ scenario, the ECC protection may be provided by directly generating the ECC check bits based on the word of data associated with the fully covered WRITE or READ operation. With the techniques set forth herein, the byte enable storage 450 may be re-purposed to store ECC check bits instead of byte enables. Consequently, data stored in the L2 cache 350 may be protected against bit errors without incurring the costs of providing additional storage or complex hardware for the ECC check bits.

At a later time, when either a client requests a word of data stored in the L2 cache 350 or a word of data needs to be written to the external memory 470, the L2 control logic 430 may be configured to retrieve ECC check bits generated for the word from the byte enable storage 450. Based on the generated ECC check bits, the L2 control logic 430 may use any of the well-known techniques in the art (e.g., checksum, parity scheme, or cyclic redundancy check) to determine whether the word of data stored in the L2 cache 350 is corrupt. If the word of data stored in the L2 cache 350 is determined to be correct, then the word can be returned to the requesting client or written to the external memory 470. If, however, the word of data stored in the L2 cache 350 is determined to be corrupt (e.g., some of the bytes associated with the word have been corrupted), the ECC check bits stored in the byte enable storage 450 may allow automatic correction of the corrupted bytes of data associated with the word.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

We claim:

1. A method for implementing error code correction (ECC) protection with respect to a write operation to an external memory via an intermediary cache, the method comprising:
   receiving a write command that includes a word of data comprised of a plurality of bytes;
   determining whether all bytes in the plurality of bytes are enabled or coherent;
   once all bytes in the plurality of bytes are enabled or coherent, generating one or more ECC check bits for the plurality of bytes; and
   storing the one or more ECC check bits in the intermediary cache instead of storing a byte enable for each byte in the plurality of bytes.

2. The method of claim 1, further comprising the step of setting an indicator bit indicating that the intermediary cache includes the one or more ECC check bits instead of a byte enable for each byte in the plurality of bytes.

3. The method of claim 2, further comprising the step of storing the indicator bit in the intermediary cache.

4. The method of claim 1, wherein one or more bytes in the plurality of bytes are determined not to be enabled or coherent, and further comprising the steps of:
   storing one or more bytes in the plurality of bytes that are enabled in the intermediary cache; and
   issuing a read command to the external memory to obtain the one or more bytes in the plurality of bytes that are not enabled.

5. The method of claim 4, further comprising the steps of:
   receiving from the external memory the one or more bytes that are not enabled;
   merging the one or more bytes received from the external memory with the one or more bytes that are enabled and stored in the intermediary cache; and
   storing the merged bytes in the intermediary cache.

6. The method of claim 1, wherein one or more bytes in the plurality of bytes are determined to be coherent but not enabled, and further comprising the steps of:
   merging the one or more bytes determined to be coherent but not enabled with the one or more bytes that are enabled and stored in the intermediary cache; and
   storing the merged bytes in the intermediary cache.

7. The method of claim 1, wherein the one or more ECC check bits are stored within a byte enable storage element within the intermediary cache, and further comprising the step of storing the plurality of bytes in a data storage element within the intermediary cache.

8. A computer-readable storage medium including instructions that, when executed by a processor, causes the processor to implement error code correction (ECC) protection with respect to a write operation to an external memory via an intermediary cache, by performing the steps of:
   receiving a write command that includes a word of data comprised of a plurality of bytes;
   determining whether all bytes in the plurality of bytes are enabled or coherent;
   once all bytes in the plurality of bytes are enabled or coherent, generating one or more ECC check bits for the plurality of bytes; and
   storing the one or more ECC check bits in the intermediary cache instead of storing a byte enable for each byte in the plurality of bytes.

9. The computer-readable storage medium of claim 8, further comprising the step of setting an indicator bit indicating that the intermediary cache includes the one or more ECC check bits instead of a byte enable for each byte in the plurality of bytes.

10. The computer-readable storage medium of claim 9, further comprising the step of storing the indicator bit in the intermediary cache.

11. The computer-readable storage medium of claim 8, wherein one or more bytes in the plurality of bytes are determined not to be enabled or coherent, and further comprising the steps of:
   storing one or more bytes in the plurality of bytes that are enabled in the intermediary cache; and issuing a read command to the external memory to obtain the one or more bytes in the plurality of bytes that are not enabled.

12. The computer-readable storage medium of claim 11, further comprising the steps of:
receiving from the external memory the one or bytes that are not enabled;
merging the one or more bytes received from the external memory with the one or more bytes that are enabled and stored in the intermediary cache; and
storing the merged bytes in the intermediary cache.

13. The computer-readable storage medium of claim 8, wherein one or more bytes in the plurality of bytes are determined to be coherent but not enabled, and further comprising the steps of:
merging the one or more bytes determined to be coherent but not enabled with the one or more bytes that are enabled and stored in the intermediary cache; and
storing the merged bytes in the intermediary cache.

14. The computer-readable storage medium of claim 8, wherein the one or more ECC check bits are stored within a byte enable storage element within the intermediary cache, and further comprising the step of storing the plurality of bytes in a data storage element within the intermediary cache.

15. A computer system configured to implement error code correction (ECC) protection with respect to a write operation to an external memory via an intermediary cache comprising:
a central processing unit (CPU);
system memory coupled to the CPU; and
a parallel processing subsystem coupled to the CPU and to the external memory and including the intermediary cache, wherein the intermediary cache includes:
a data storage element
a byte enable storage element, and
control logic configured to:
receive a write command that includes a word of data comprised of a plurality of bytes,
determine whether all bytes in the plurality of bytes are enabled or coherent,
once all bytes in the plurality of bytes are enabled or coherent, generate one or more ECC check bits for the plurality of bytes,
store the plurality of bytes in the data storage element, and
store the one or more ECC check bits in the byte enable storage element instead of storing a byte enable for each byte in the plurality of bytes.

16. The computer system of claim 15, wherein the control logic is further configured to set an indicator bit indicating that the intermediary cache includes the one or more ECC check bits instead of a byte enable for each byte in the plurality of bytes.

17. The computer system of claim 16, wherein the intermediary cache further comprises an indicator storage element, and the control logic is further configured to store the indicator bit in the indicator storage element.

18. The computer system of claim 15, wherein the control logic determines that one or more bytes in the plurality of bytes are not enabled or coherent, and the control logic is further configured to:
store one or more bytes in the plurality of bytes that are enabled in the data storage element;
issue a read command to the external memory to obtain the one or more bytes in the plurality of bytes that are not enabled;
receive from the external memory the one or bytes that are not enabled;
merge the one or more bytes received from the external memory with the one or more bytes that are enabled and stored in the data storage element; and
store the merged bytes in the data storage element.

19. The computer system of claim 15, wherein the control logic determines that one or more bytes in the plurality of bytes are coherent but not enabled, and the control logic is further configured to:
merge the one or more bytes determined to be coherent but not enabled with the one or more bytes that are enabled and stored in the intermediary cache; and
store the merged bytes in the intermediary cache.

20. The computer system of claim 15, wherein the parallel processing subsystem comprises a graphics subsystem that includes a graphics processing unit.

* * * * *